(12) United States Patent
Ventresca et al.

(10) Patent No.: US 7,994,100 B2
(45) Date of Patent: Aug. 9, 2011

(54) REVERSIBLE GELLING SYSTEM AND METHOD USING SAME DURING WELL TREATMENTS

(75) Inventors: Maria Luisa Ventresca, Los Teques (VE); Iraima Fernandez, San Antonio de los Altos (VE); Geidy Navarro-Perez, Los Teques (VE)

(73) Assignee: INTEVEP, S.A., Caracas (VE)

( * ) Notice: Subject to any disclaimer, the term of this patent is extended or adjusted under 35 U.S.C. 154(b) by 0 days.

(21) Appl. No.: 12/616,331

(22) Filed: Nov. 11, 2009

(65) Prior Publication Data
US 2011/0021387 A1 Jan. 27, 2011

Related U.S. Application Data

(62) Division of application No. 10/910,934, filed on Aug. 3, 2004, now Pat. No. 7,638,467.

(51) Int. Cl.
*C09K 8/588* (2006.01)
*E21B 43/16* (2006.01)
*B01F 3/12* (2006.01)

(52) U.S. Cl. .......... 507/221; 166/305.1; 516/77

(58) Field of Classification Search ........ 507/221; 166/305.1; 516/77
See application file for complete search history.

(56) References Cited

U.S. PATENT DOCUMENTS

| | | | |
|---|---|---|---|
| 3,709,300 A * | 1/1973 | Pye | 166/280.1 |
| 3,815,681 A | 6/1974 | Richardson | |
| 4,595,513 A | 6/1986 | Morgenthaler et al. | |
| 4,741,401 A | 5/1988 | Walles et al. | |
| 5,159,980 A | 11/1992 | Onan et al. | |
| 5,224,544 A | 7/1993 | Tjon-Joe-Pin et al. | |
| 5,414,052 A | 5/1995 | Mahabadi et al. | |
| 6,607,828 B1 | 8/2003 | Hasaka | |
| 2002/0160920 A1 | 10/2002 | Dawson et al. | |

FOREIGN PATENT DOCUMENTS

DE 199 63 304 A1 6/2000

* cited by examiner

*Primary Examiner* — Timothy J. Kugel
(74) *Attorney, Agent, or Firm* — Bachman & LaPointe, P.C.

(57) ABSTRACT

An all-oil reversible gelling system includes a polymer, a crosslinker, a gel accelerator, and an oxidant, wherein temperature activates the crosslinker so as to cause the system to form a gel, and the oxidant subsequently decomposes the gel. This gel is designed to seal temporarily portions of oil-producing or water or gas injecting subterranean formations.

14 Claims, 14 Drawing Sheets

REVERSIBLE GELLING SYSTEM AND METHOD USING SAME DURING WELL TREATMENTS

CROSS REFERENCE TO RELATED APPLICATIONS

This application is the U.S. divisional application of U.S. application Ser. No. 10/910,934 filed Aug. 3, 2004, now U.S. Pat. No. 7,638,467.

BACKGROUND OF THE INVENTION

The invention relates to a gel system and a method for using the gel system in a permeable formation to produce a hydrocarbon product.

Hydrocarbon producing wells or injector wells of water or gas typically require treatments in the lifetime of the well to enhance production or injection.

Such treatments frequently involve the treatment of damaged zones, layers or portions of formations drilled through by a subterranean well to improve the characteristics of that damaged zone.

Unfortunately, most treatments and the like are delivered to the well by pumping fluids containing the treatment into the well. When the zone to be treated has relatively lower permeability because it is more damaged, the fluid flow and, consequently, most of the treatment, tends to flow into the relatively higher permeability formations or less damaged and is therefore wasted as to any potential effect on the desired zone.

There are also some treatments where a temporarily plugging is required to protect a producing or injecting zone.

Mechanical isolation of a zone to be treated has been one method attempted to resolve this issue. However, this method is useful only if the higher permeability zone, or "thief zone", is below the zone to be treated.

Ball sealers are also used, but this is only useful if the well has been completed with drilled cased cement, and the cement is competent.

Small sized solids have been used, such as benzoic acid, naphthalene and salts, but these small solids can be very difficult to remove and, therefore, can cause formation damage. Further, usefulness of these solids as diverting agents can be inefficient due to poor size distribution.

Based upon the foregoing, it is clear that the need remains for a simple and effective method for delivering a treatment to a relatively lower permeability or more damaged formation or zone which does not permanently damage the formation, which does not result in loss or waste of a substantial portion of the treatment materials, and that can be used when hydrocarbon-based treating fluids are used.

It is the primary object of the present invention to provide such a method and system for use in same.

Other objects and advantages of the present invention will appear herein below.

SUMMARY OF THE INVENTION

In accordance with the present invention, the foregoing objects and advantages have been readily attained.

According to the invention, a reversible gelling system is provided which comprises a polymer, a crosslinker, a gel accelerator, and an oxidant, wherein temperature activates the crosslinker so as to cause the system to form a gel, and the oxidant subsequently decomposes the gel after a desired period of time.

In further accordance with the present invention, a method for reversibly positioning a gel in a permeable formation is provided, which method comprises the steps of providing a reversible gelling system comprising a polymer, a crosslinker, a gel accelerator, and an oxidant, wherein temperature activates the crosslinker so as to cause the system to form a gel, and the oxidant subsequently decomposes the gel, pumping the system into a well communicated with the permeable formation whereby the system flows substantially to the permeable formation, wherein formation temperature causes the system to form a gel in the permeable formation, and allowing the gel to stay in the permeable formation until the gel decomposes.

In further accordance with the invention, a method for delivering a treatment to a relatively less permeable formation in a well containing a relatively more permeable formation is provided, which method comprises the steps of providing a reversible gelling system comprising a polymer, a crosslinker, a gel accelerator, and an oxidant, wherein temperature activates the crosslinker so as to cause the system to form a gel, and the oxidant subsequently decomposes the gel, pumping the system into the well whereby the system flows substantially to the relatively more permeable formation and wherein formation temperature causes the system to gel in the relatively more permeable formation, pumping a treatment fluid into the well while the gel is in the relatively more permeable formation whereby the treatment fluid flows substantially to the relatively low permeability formation, and allowing the system to decompose and flow out of the relatively more permeable formation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

A detailed description of preferred embodiments of the present invention follows, with reference to the attached drawings, wherein.

Like reference numbers and designations in the various drawings indicate like elements.

DETAILED DESCRIPTION

The invention relates to a reversible gelling system and method for using same. One particularly useful application of the reversible gelling system of the present invention is to temporarily mask or block flow into a relatively higher permeability formation or zone of a well so that treatment fluids can be pumped into a relatively less permeable zone or formation of the well, for example, in order to stimulate production from this portion of the well.

In accordance with the invention, the reversible gelling system advantageously contains several components which advantageously cause the system to temporarily form a relatively high strength gel when exposed to formation temperatures in a relatively short period of time, typically up to no more than about four hours. The system further contains an additional component which causes the gel, once formed, to decompose after a given amount of time, preferably between about 20 and about 48 hours, more preferably between about 20 and about 36 hours. When the gel decomposes, it advantageously decomposes into relatively small-molecule sized oil soluble components which can readily be pumped from or flow out of the high permeability zone, whereby this zone is not damaged or otherwise adversely affected by the treatment.

In accordance with the invention, the system as identified above can advantageously be used to mask or block flow into high permeability zones of a well so that fluids containing treatment can then be pumped into lower permeability formations or zones, for example, for the purpose of treating these zones to stimulate production therefrom.

Reference is made herein to relatively more and relatively less permeable formations. It should be noted that such formations can naturally be in that condition, or can be damaged from some other cause or extended production, etc., to have relatively higher or lower permeability. As used herein, the terms relatively more and relatively less permeable formations specifically include those which have been more or less damaged so as to result in the aforesaid difference in permeability.

Figure 1:
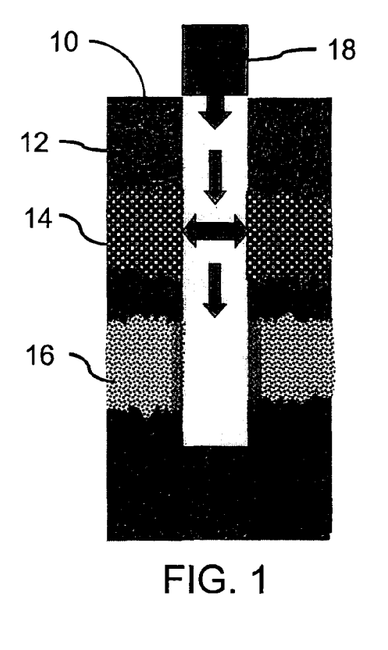
FIG. 1 illustrates a well drilled through various formations and shows the problem with loss of stimulation fluid.

FIG. 1 illustrates a typical well 10 penetrating an earth formation 12. The well penetrates two production zones 14 and 16, a relatively high permeability zone 14 and a damaged or otherwise relatively low permeability zone 16. A well treatment or stimulation fluid 18, when pumped into this well 10, will flow primarily into the relatively higher permeability zone 14, where the treatment is least needed. This results in very little treatment actually reaching zone 16 where it is desired.

Figure 2A:
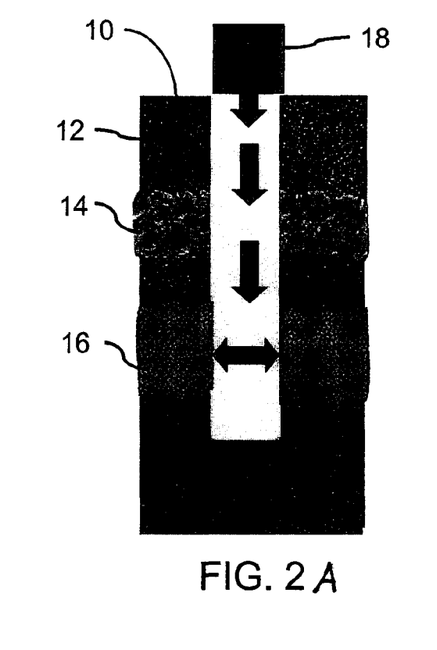
FIG. 2A shows the same well with the relatively more permeable formation treated with a gel so that stimulation fluid is delivered to the zone where it is desired.
Figure 2B:
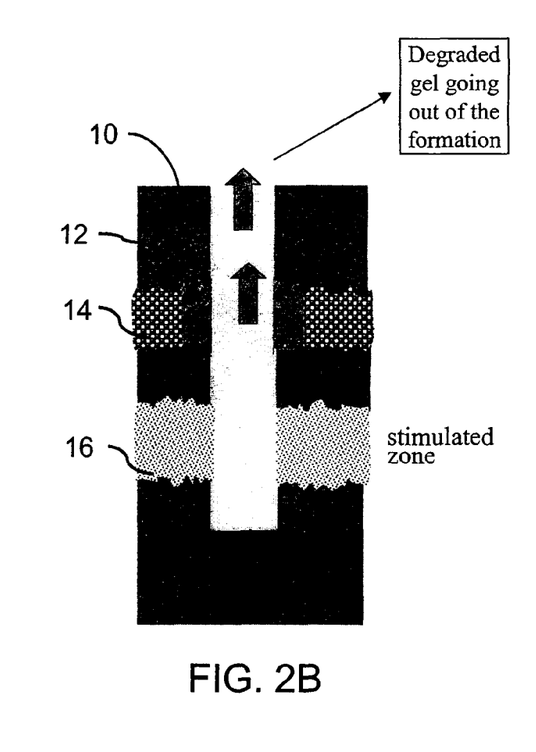
FIG. 2B shows the same well after the stimulation treatment when the gel has decomposed and the hydrocarbon formation fluids easily remove it.

FIG. 2A shows well 10 after treatment in accordance with the present invention and having a reversible gelling system disposed in zone 14 to mask the permeability of this zone. As illustrated in FIG. 2, treatment fluid 18 when pumped into well 10 in this condition advantageously flows into zone 16 where it is desired. FIG. 2B shows the gel, which has degraded after a time t, and shows removal of the degraded gel from the well as the well is returned to production.

In accordance with the present invention, the reversible gelling system advantageously comprises a polymer component, a crosslinker component, a gel accelerator component, and an oxidant component. These components are all advantageously oil soluble, and can advantageously be disposed into a well through dissolution into an oil solvent.

The polymer can be any suitable polymer, preferably an oil soluble polymer, more preferably a rubber, and most preferably a copolymer of styrene-butadiene.

The crosslinker can be any suitable crosslinker for crosslinking the copolymer as desired, and can advantageously be a dialkyl peroxide, preferably one selected from the group consisting of di-tert-butylperoxide, dicumyl peroxide, and combinations thereof.

The accelerator is advantageously a vulcanization accelerator, and one particularly well suited accelerator is benzothiazil-2-cyclohexyl sulfenamide.

The oxidant can be any suitable gel decomposition causing oxidant, preferably a hydroperoxide, and more preferably a hydroperoxide selected from the group consisting of cumyl hydroperoxide, tert-butyl hydroperoxide and combinations thereof.

Figure 3:
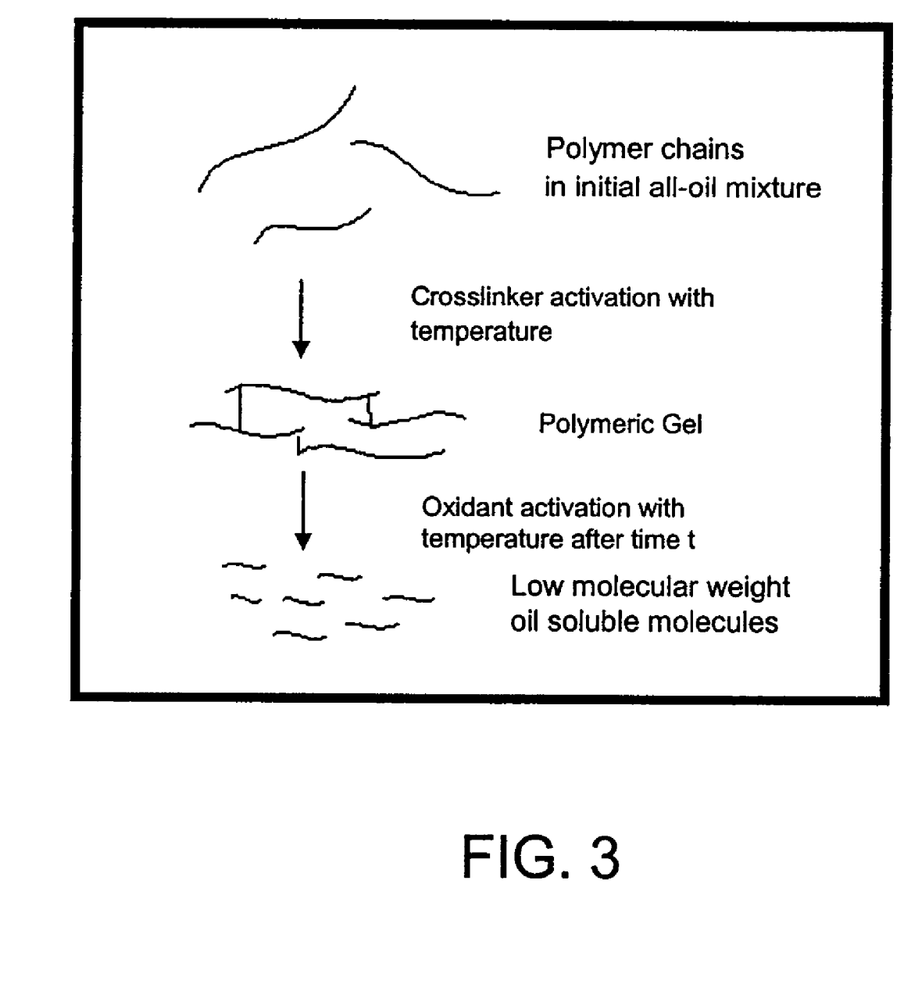
FIG. 3 shows transition of a reversible gelling system in accordance with the present invention from initial state to a polymeric gel and then through oxidant decomposition to low molecular weight oil-soluble molecules.

The initial mixture contains polymer chains in a non-gelled and flowable solution, as illustrated in FIG. 3. When exposed to sufficient temperatures, typically temperatures of between about 200° F. and about 350° F., the crosslinker decomposes to form the active species that react with the polymer, over a relatively short period of time, and a polymeric gel results. This is illustrated in the second frame of FIG. 3.

Following a desired amount of time, oxidant contained within the system leads to decomposition of the gel so as to provide low molecular weight oil-soluble molecules as illustrated in the third frame of FIG. 3.

The gel accelerator serves to shorten the gelling time of the system, and typically results in formation of gel in a period of time of less than or equal to about 4 hours, more typically between about 3 and about 6 hours.

The oxidant component serves to decompose or reverse the gelling of the system, and the amount and type of oxidant can be selected and incorporated into the system as desired so as to provide a degradation time of preferably between about 20 and about 36 hours.

All components being oil soluble, and degradation operating as it does to provide low molecular weight oil-soluble molecules, advantageously results in a system which does not leave residue that can cause formation damage in the relatively more permeable formation or zone.

In accordance with the invention, the crosslinker, gel accelerator, and oxidant components of the reversible gelling system can advantageously be altered in types and amounts so as to provide, when considering the temperature to which they will be exposed in the well, a desired gel formation rate and a desired gel decomposition rate.

As set forth above, all components of the reversible gelling system of the present invention are advantageously soluble in oil, and the components can advantageously be dissolved in organic solvent, for example, gas-oil or paraffinic oils, or the like.

In accordance with the invention, the system contains polymer, crosslinker, gel accelerator, and oxidant in the system in amounts as follows: polymer between about 1 and about 5% wt., preferably between about 2.25 and about 3.0% wt.; crosslinker between about 2.00 and about 4.00% wt.; gel accelerator between about 0.10 and about 1.0% wt.; and oxidant between about 0.30 and about 1.5% wt.

As set forth above, the system of the present invention can advantageously be utilized as illustrated in FIG. 2 to position a gel within a relatively permeable formation so as to substantially mask or block permeability of this formation and thereby guide or divert flow into the well to a different zone therein.

Thus, in accordance with the present invention, the system can advantageously be pumped into a well such as well 10 in FIG. 2 whereby the system flows substantially to the relatively high permeability formation, and formation temperature causes the system to form a gel in the permeable formation. This gel sets up and stays for a period determined by the amount and type of oxidant contained in the composition, which leads to or mediates gel decomposition after a preselected period of time. The result is a readily reversible, or temporary, masking of the permeability of the relatively high permeability formation.

In further accordance with the present invention, this gelling system can advantageously be utilized to deliver a treatment fluid to a damaged or relatively low permeability zone of a well. In order to do this, a system in accordance with the present invention is pumped into the well where it flows to the relatively high or more permeable formation and forms a gel after a sufficient period of time. Once this gel is formed, the treatment fluid can be pumped into the well while the gel is in the more permeable formation, and the treatment will therefore be diverted from the more permeable formation to the relatively low permeability formation where the desired treatment can take place. The treatment fluid can be any treatment which would be well known to a person of ordinary skill in the art which might be desired to be disposed to a damaged or relatively low-permeability formation.

After the given amount of time as set by the oxidant of the system, the gel decomposes into relatively small molecule oil-solvent matter which can readily be removed from the permeable formation as desired.

This advantageously allows for efficient and effective treatment of damaged zones or formations in a well without adversely impacting the production or injectivity from the higher permeability zones, and without substantial waste and/or risk of damage to other formations.

The qualitative gel strength of a gel is determined in accordance with a qualitative gel strength code which is set forth below in Table 1.

TABLE 1

| Code | Appearance |
| --- | --- |
| A | No change in appearance (no gel formed) |
| B | Viscous solution |
| C | Very weak highly flowing gel |
| D | Very weak flowing gel |
| E | Very weak moderately flowing gel |
| F | Weak flowing gel |
| G | Weak moderately flowing gel |
| H | Weak barely flowing gel |
| I | Highly deformable nonflowing gel |
| J | Moderately deformable nonflowing gel |
| K | Slightly deformable nonflowing gel |
| L | Rigid gel |

Example 1

Three different formulations of the system of the present invention were prepared. Each of these formulations was prepared using 2.5% w/w of styrene-butadiene as polymer, 2.75% w/w of dicumyl peroxide, 0.80% w/w of benzothiazil-2-cyclohexyl sulfenamide (CBS), and different amounts of oxidant. These three different formulations were then exposed to a temperature of 135° C. (275° F.) and gel strength was observed for each composition over a period of 48 hours. Table 2 below sets forth the specific compositions and the gel strength over time as observed for each of these compositions.

TABLE 2

| Sample | Polymer (% w/w) | Crosslinker B (% w/w) | Accelerator (% w/w) | Oxidant (% w/w) |
| --- | --- | --- | --- | --- |
| 135-O-48 | 2.5 | 2.75 | 0.80 | 0.50 |
| 135-O-49 | 2.5 | 2.75 | 0.80 | 0.70 |
| 135-O-50 | 2.5 | 2.75 | 0.80 | 0.90 |

| Time (h) | 135-O-48 | 135-O-49 | 135-O-50 |
| --- | --- | --- | --- |
| 1 | A | A | A |
| 2 | A | A | A |
| 3 | A | A | A |
| 4 | F | D | A |
| 5 | I | G | D |
| 6 | I | G | D |
| 7 | I | G | G |
| 8 | I | G | G |
| 23 | G | F | D |
| 24 | G | F | D |
| 25 | G | F | D |
| 26 | G | F | D |
| 27 | D | C | B |
| 28 | D | C | B |
| 29 | D | C | A |
| 30 | B | C | A |
| 31 | B | B | A |
| 32 | A | A | A |
| 48 | A | A | A |

As shown in Table 2, these systems in accordance with the present invention performed as desired, rapidly forming a gel, and maintaining this gel for an extended period of time followed by decomposition back to a no-gel state.

Example 2

Figure 4:
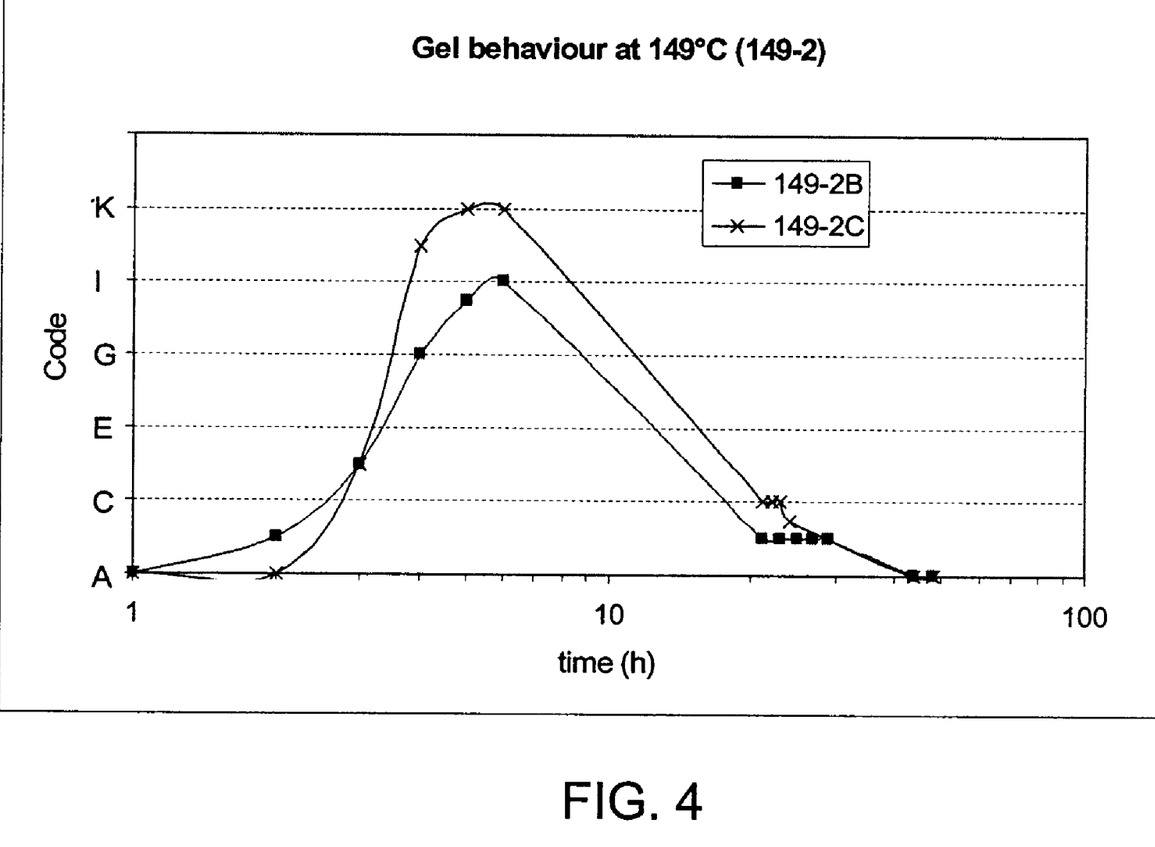
FIGS. 4 and 5 illustrate the gel formation and destruction of reversible gelling systems in accordance with the present invention.
Figure 5:
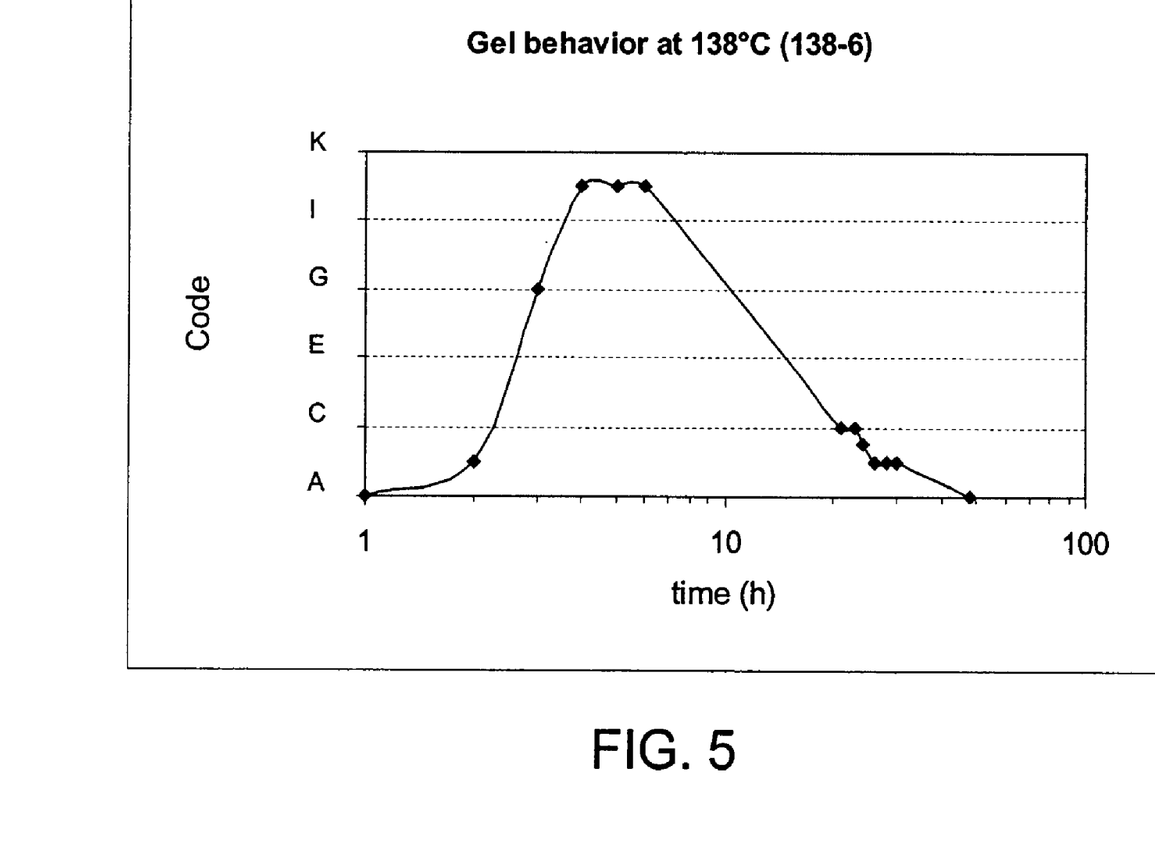

FIGS. 4 and 5 illustrate the gel strength profile at 149° C. (300° F.) and at 138° C. (280° F.) for a system according to the present invention containing 2.5% w/w polymer, 2.75% w/w of crosslinker A (FIG. 3) and 2.85% w/w of crosslinker B (FIG. 4), oxidant in an amount of 0.6% w/w and 0.4% w/w respectively, and accelerator in an amount of 0.2% w/w and 0.4% w/w respectively. As shown, for each of these systems, gel formed relatively quickly as desired, stayed in place for a period of time, and then decomposed back to the non-gel system.

Example 3

A further system in accordance with the present invention was prepared using 2.5% w/w of polymer, 3.00% w/w crosslinker A, 0.20% w/w accelerator, and 0.60% w/w oxidant.

Figure 6:
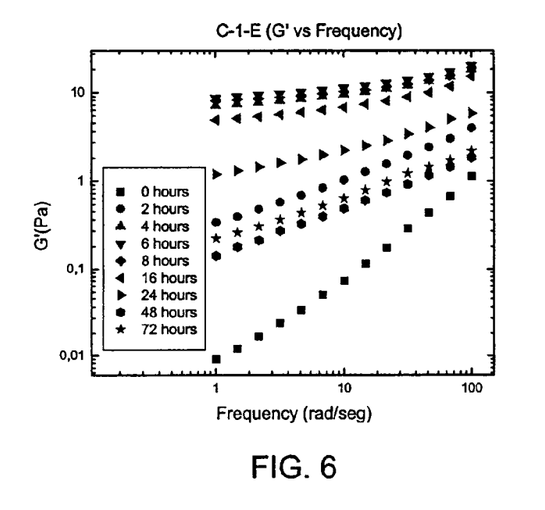
FIGS. 6-8 show rheological measurements of gel strength for various frequencies and over time, and also a gel strength versus time profile for a further reversible gelling system in accordance with the present invention.
Figure 7:
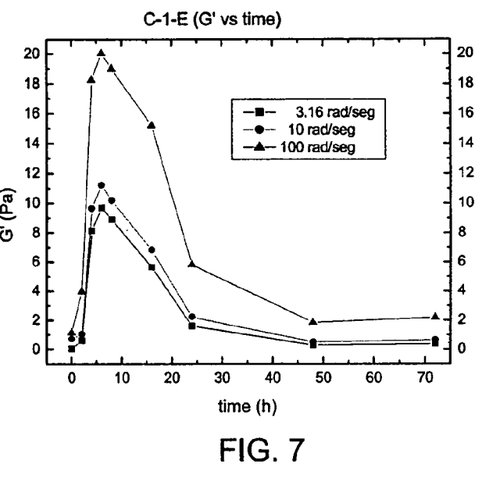
Figure 8:
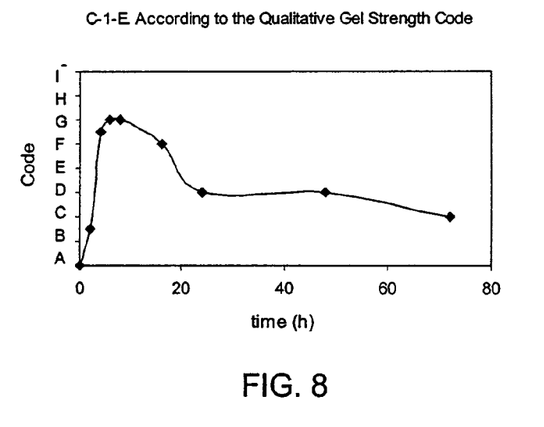

This system was gelled at 149° C. (300° F.), samples were taken over a period of 72 hours and tested for oscillatory shear (G', Pa) at various frequencies. FIG. 6 shows the result of this testing. FIG. 7 shows shear over time at three different frequencies, and FIG. 8 shows gel strength over time for this composition using the gel strength code. These figures illustrate that this system in accordance with the present invention performs as desired.

Example 4

Figure 9:
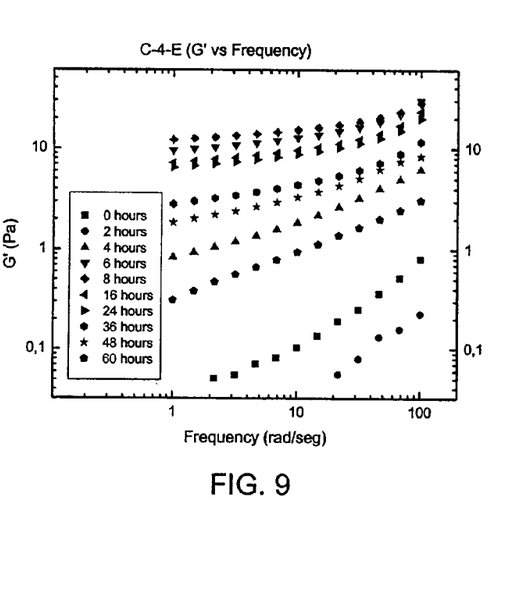
FIGS. 9-11 show data similar to that illustrated in FIGS. 6-8 for a further reversible gelling system in accordance with the present invention.
Figure 10:
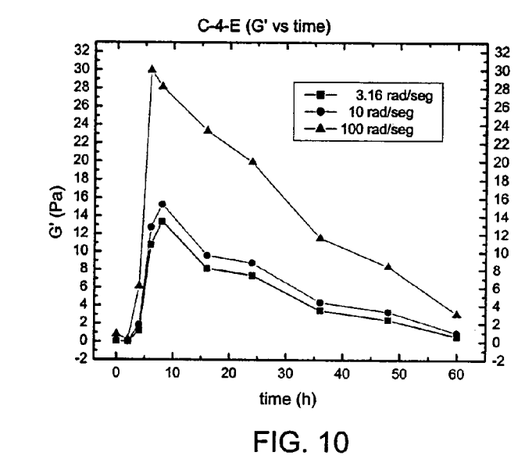
Figure 11:
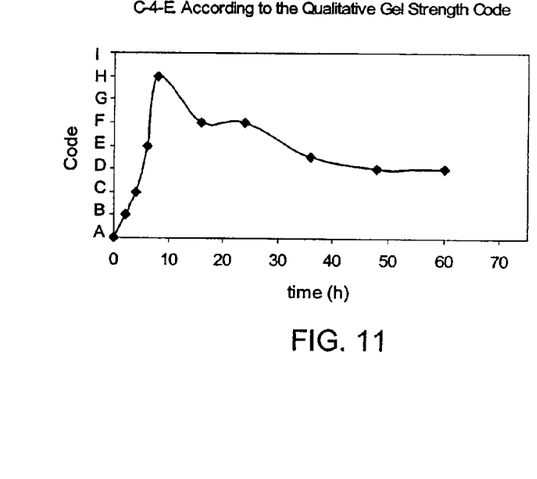

A further system in accordance with the present invention was prepared utilizing 2.5% w/w polymer, 2.5% w/w of crosslinker A, 0.20% w/w of accelerator, and 0.60% w/w oxidant. Rheological measurements were taken in connection with this sample and FIGS. 9-11 show the results. As with the previous example, these figures show that the fluid behaves as desired in accordance with the present invention.

Example 5

Figure 12:
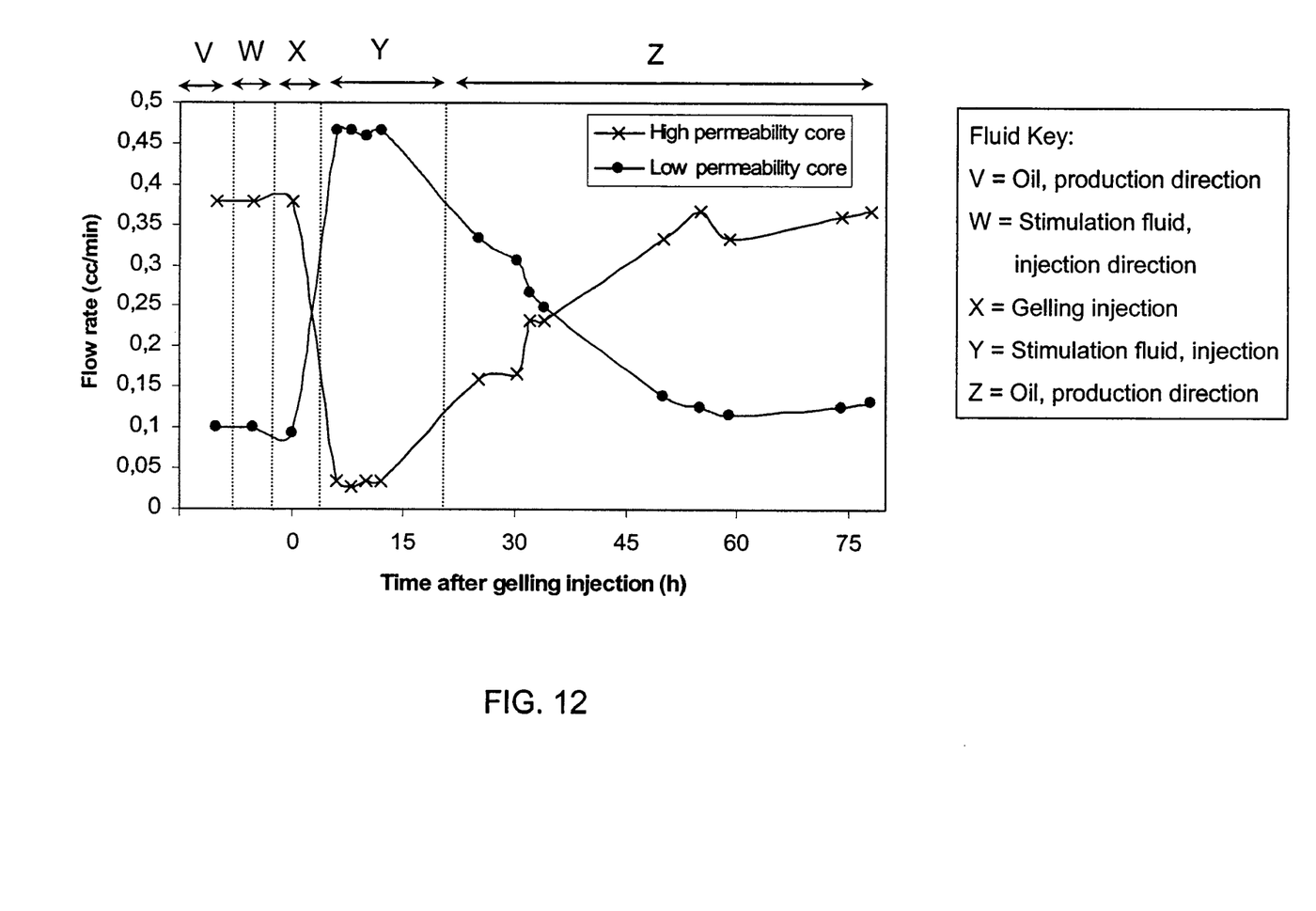
FIGS. 12 and 13 show flow and pressure drop for two parallel cores which have been treated using the system and method in accordance with the present invention.
Figure 13:
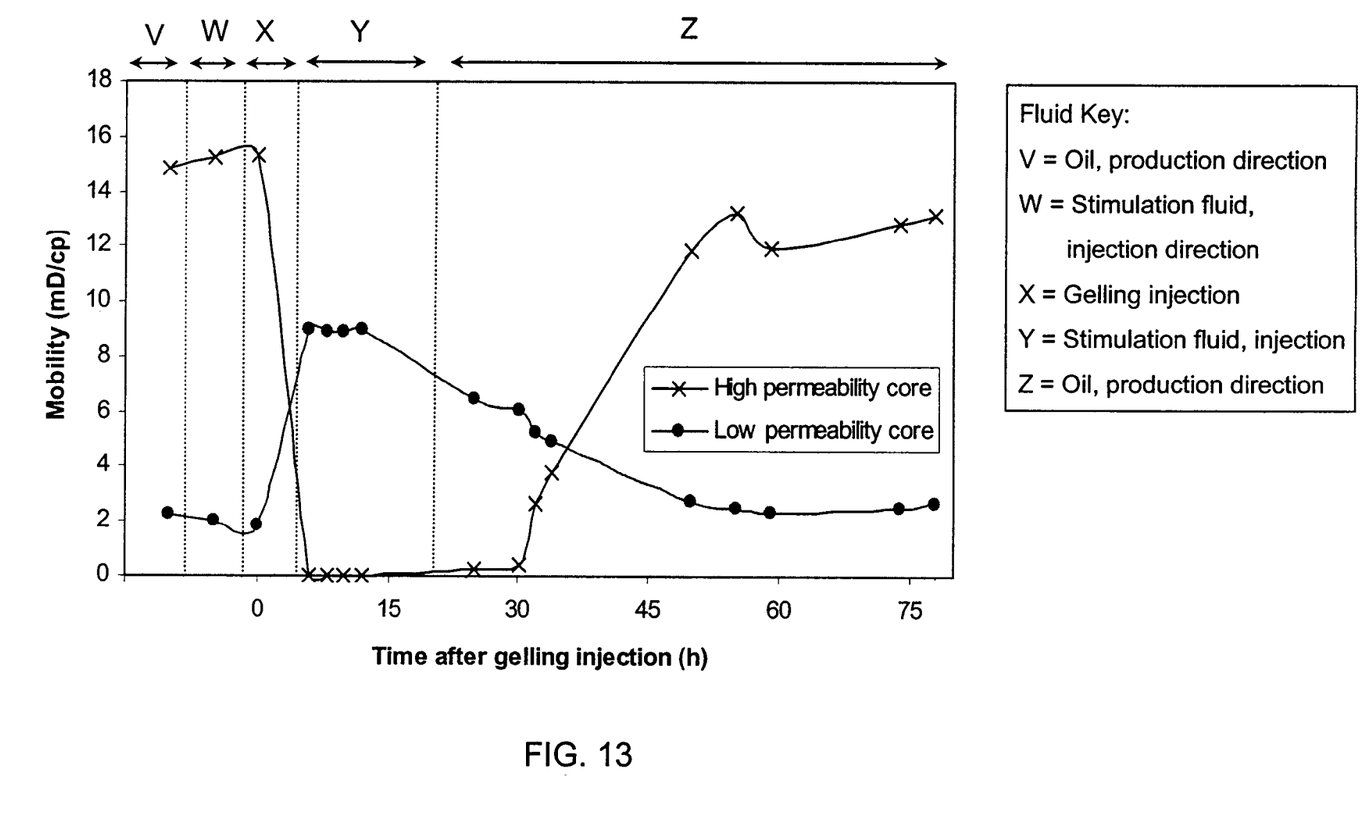

A further system was prepared in accordance with the present invention and contained 2.5% w/w of polymer, 2.75% w/w of crosslinker A, 0.2% w/w of accelerator, and 0.6% w/w of oxidant. It was then tested utilizing two core samples placed in parallel that were subject to simultaneous injection. The purpose was to simulate a stimulation treatment. The two core samples had different initial permeabilities of 200.37 mD and 43.8 mD, respectively, and the temperature of the test was 145° C. (293° F.). FIGS. 12-13 show the results in terms of flow rate and mobility over time. First, the initial fluid distribution and mobilities between the two cores was determined for oil and for a stimulation fluid (V and W). Second, the gelling formulation was injected (X) and left inside the cores waiting for the gelling time. When the time for gel formation was reached the stimulation fluid was injected each two hours in order to test the divergency (Y). The next step was to wait for the destruction time of the gel and inject oil in production direction to register the recovery of the initial conditions (Z). In this test the time between the last stimulation fluid injection and the first oil injection was twelve hours, and the recovery of the initial conditions took place after 50 hours of the gelling injection.

As shown, flow through the cores over time switched between the two cores during the period when the gel has set up in the core. This is as desired.

The FIGS. 12 and 13 show that the fluid performs as desired in accordance with the present invention. Further, the system as tested showed a profile of gel strength over time as shown in Table 3 below.

TABLE 3

| Time (h) | 145-O-39 |
|---|---|
| 01:00 | A |
| 03:00 | A |
| 04:00 | D |
| 05:00 | G |
| 06:00 | G |
| 07:00 | H |
| 11:00 | H |
| 12:00 | H |
| 24:00 | E |
| 25:00 | E |
| 26:00 | C |
| 27:00 | C |
| 28:00 | B |
| 29:00 | B |
| 30:00 | A |
| 33:00 | A |

Example 6

Figure 14:
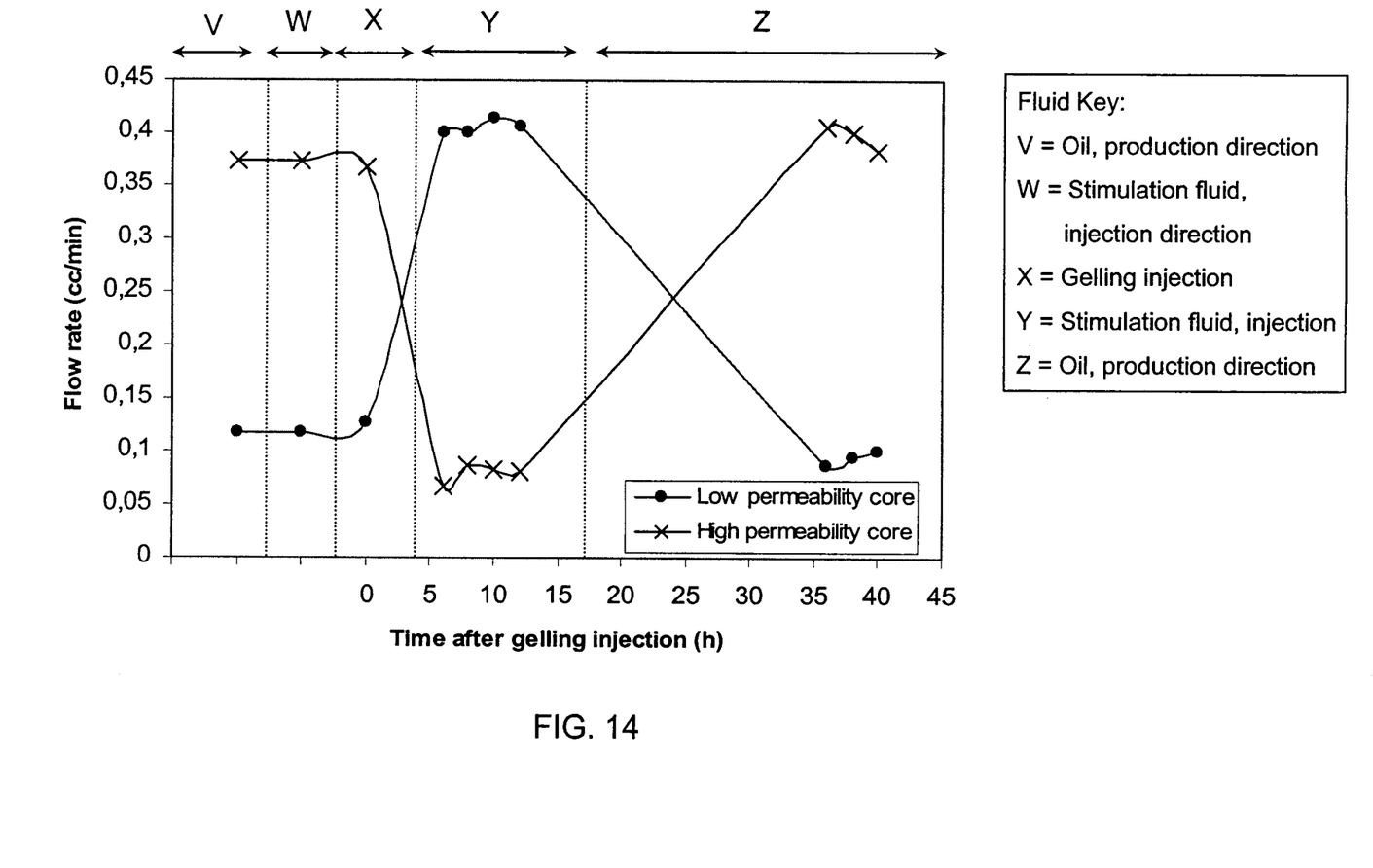
FIGS. 14 and 15 show flow and pressure drop for parallel cores treated in accordance with the system and method of the present invention.
Figure 15:
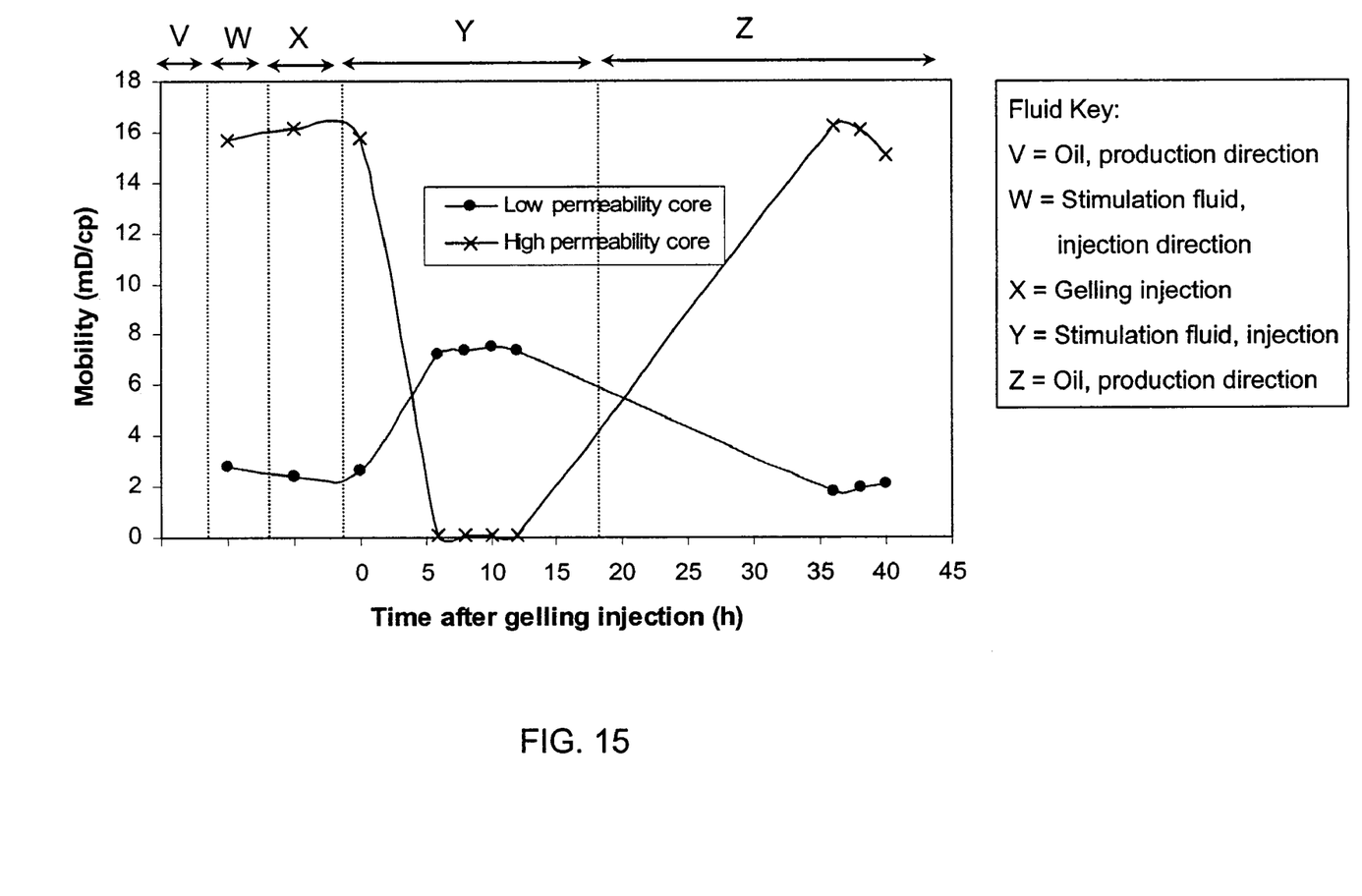

The same system as tested in the previous example was then tested again utilizing two core samples that were subject to simultaneous injection. The two core samples had different initial permeabilities of 199.7 mD and 42.3 mD, respectively. But in this test the time between the last stimulation fluid injection and the first oil injection was twenty four hours, and the recovery of the initial conditions took place after 36 hours of the gelling injection. FIGS. 14-15 show the results of this test in terms of flow rate and mobility, and show that the fluid performed as desired. Table 4 below sets forth the gel strength profile for this fluid under these conditions.

TABLE 4

| time (h) | 145-O-39 |
|---|---|
| 01:00 | A |
| 02:00 | A |
| 03:00 | C |
| 04:00 | D |
| 05:00 | G |
| 06:00 | H |
| 08:00 | H |
| 10:00 | H |
| 12:00 | H |
| 24:00 | D |
| 26:00 | D |
| 27:00 | C |
| 28:00 | B |
| 29:00 | A |
| 30:00 | A |

Example 7

A further sample of the system in accordance with the present invention was prepared and included 2.5% w/w polymer, 2.75% w/w crosslinker B, 0.8% w/w accelerator, and 0.5% oxidant. This system was tested utilizing two core samples placed in parallel that were subject to simultaneous injection at a temperature of 135° C. (275° F.), one having a permeability of 254 mD and the other having a permeability of 55 mD.

Figure 16:
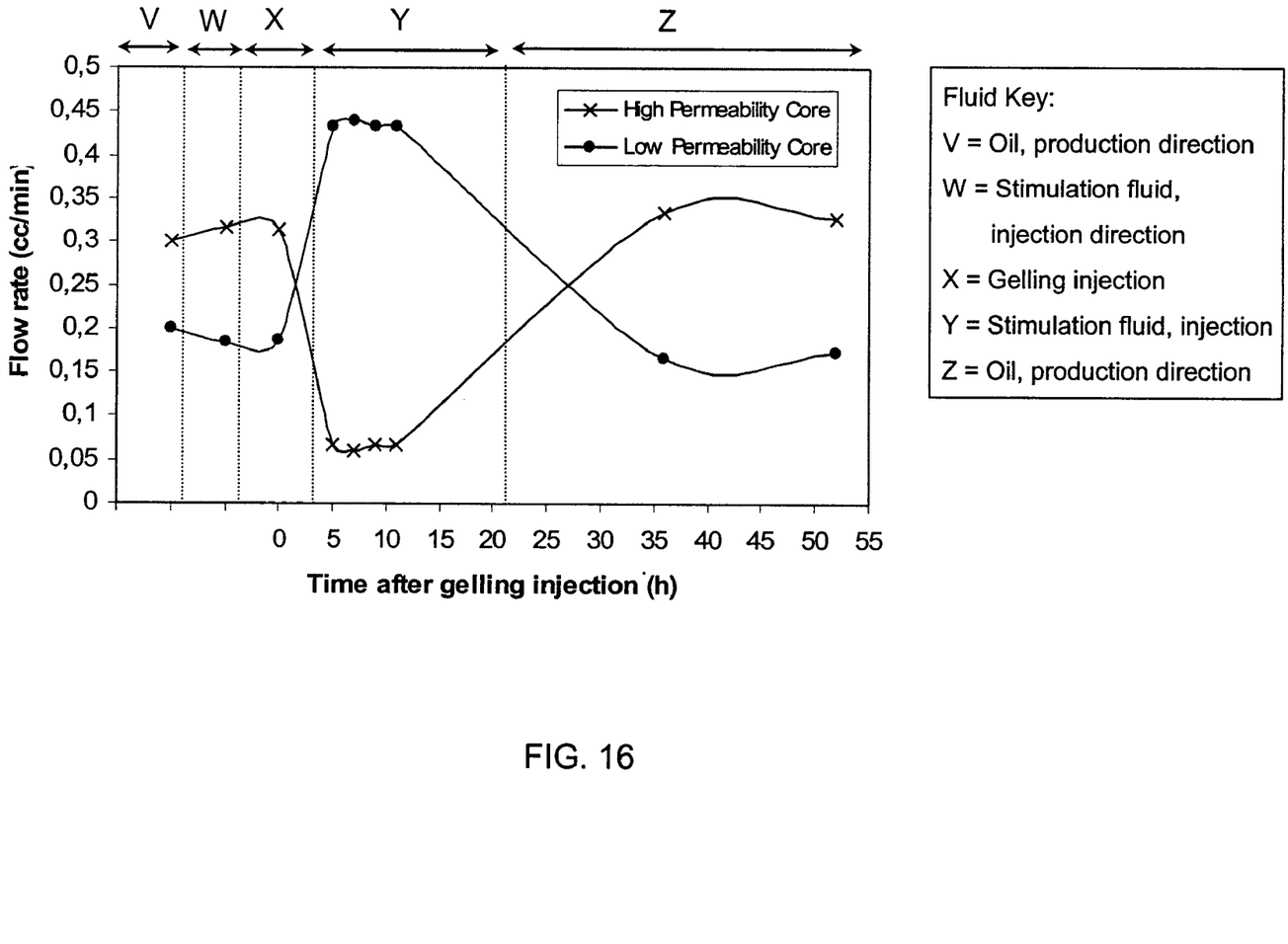
FIGS. 16 and 17 show flow rate and pressure drop for two parallel cores treated in accordance with the present invention.
Figure 17:
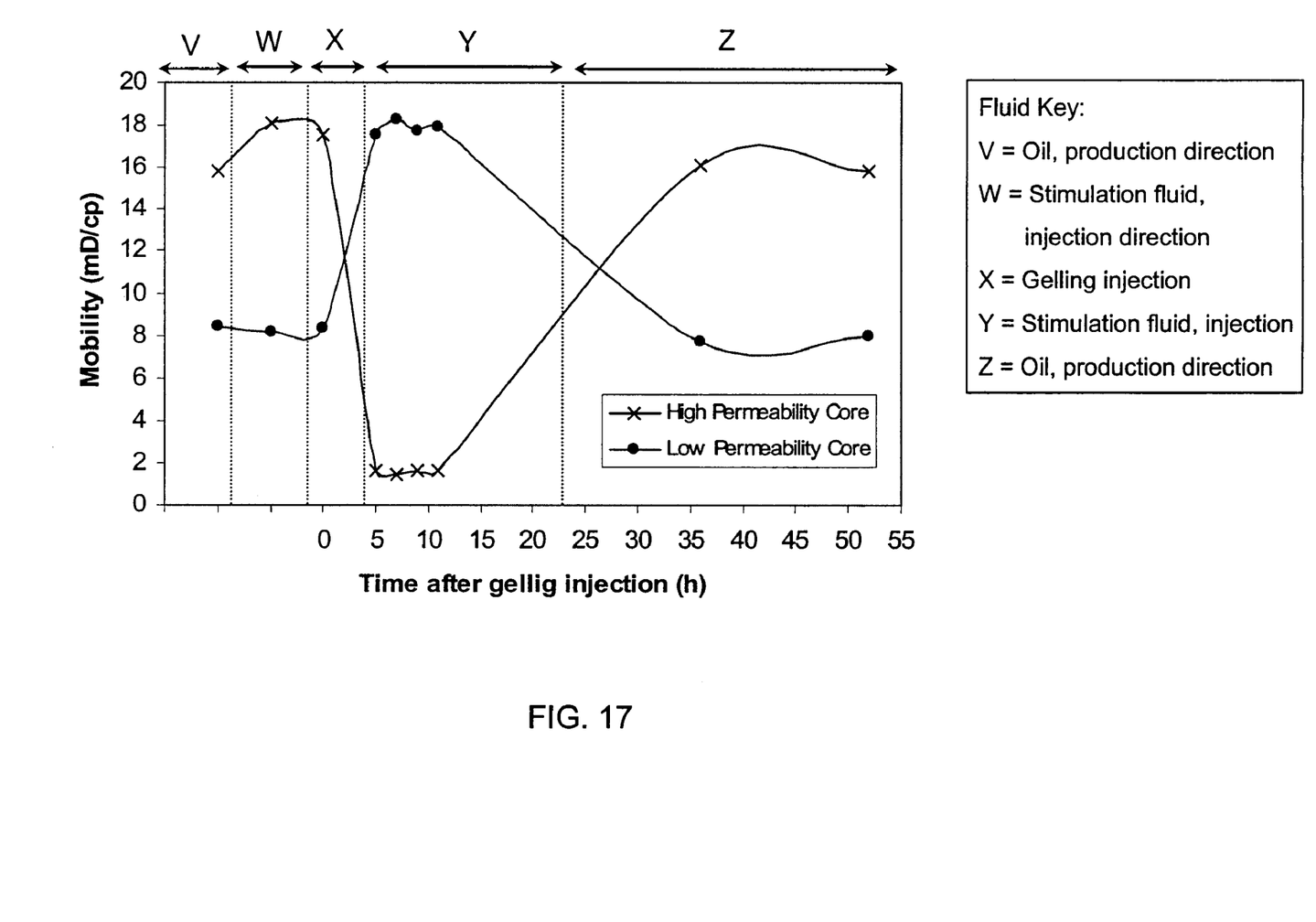

Flow rate over time and mobility over time were then measured through both cores, and the results are shown in FIGS. 16 and 17. As shown, flow through the cores over time switched between the two cores during the period when the gel has set up in the core. This is as desired.

FIG. 17 shows a lower mobility at this same time stage for the high permeability core.

The gel strength for this sample is also illustrated in Table 5 below.

TABLE 5

| time (h) | 135-O-48 |
|---|---|
| 1:00 | A |
| 2:00 | A |
| 3:00 | C |
| 4:00 | G |
| 5:00 | H |
| 6:00 | H |
| 7:00 | H |
| 8:00 | H |
| 9:00 | H |
| 27:00 | G |
| 28:00 | G |
| 29:00 | F |
| 30:00 | F |
| 31:00 | F |
| 32:00 | E |
| 33:00 | C |
| 35:00 | A |

Example 8

The same system as tested in the example 5 was then tested again utilizing two core samples in parallel that were subject to simultaneous injection at a temperature of 145° C. (293°

F.), one having an initial permeability of 110.4 mD and the other having a permeability of 109 mD.

The core of 110.4 mD was treated with the supernatant liquid of a centrifuged oil-based drilling mud, in order to cause a damage in this core. After this step the stimulation fluid was mainly flowing through the undamaged core. Then the gelling mixture was injected and after the gel formation the stimulation fluid could be injected to the damaged core, and initial conditions were almost recovered after gel destruction and flowing back of the oil.

Figure 18:
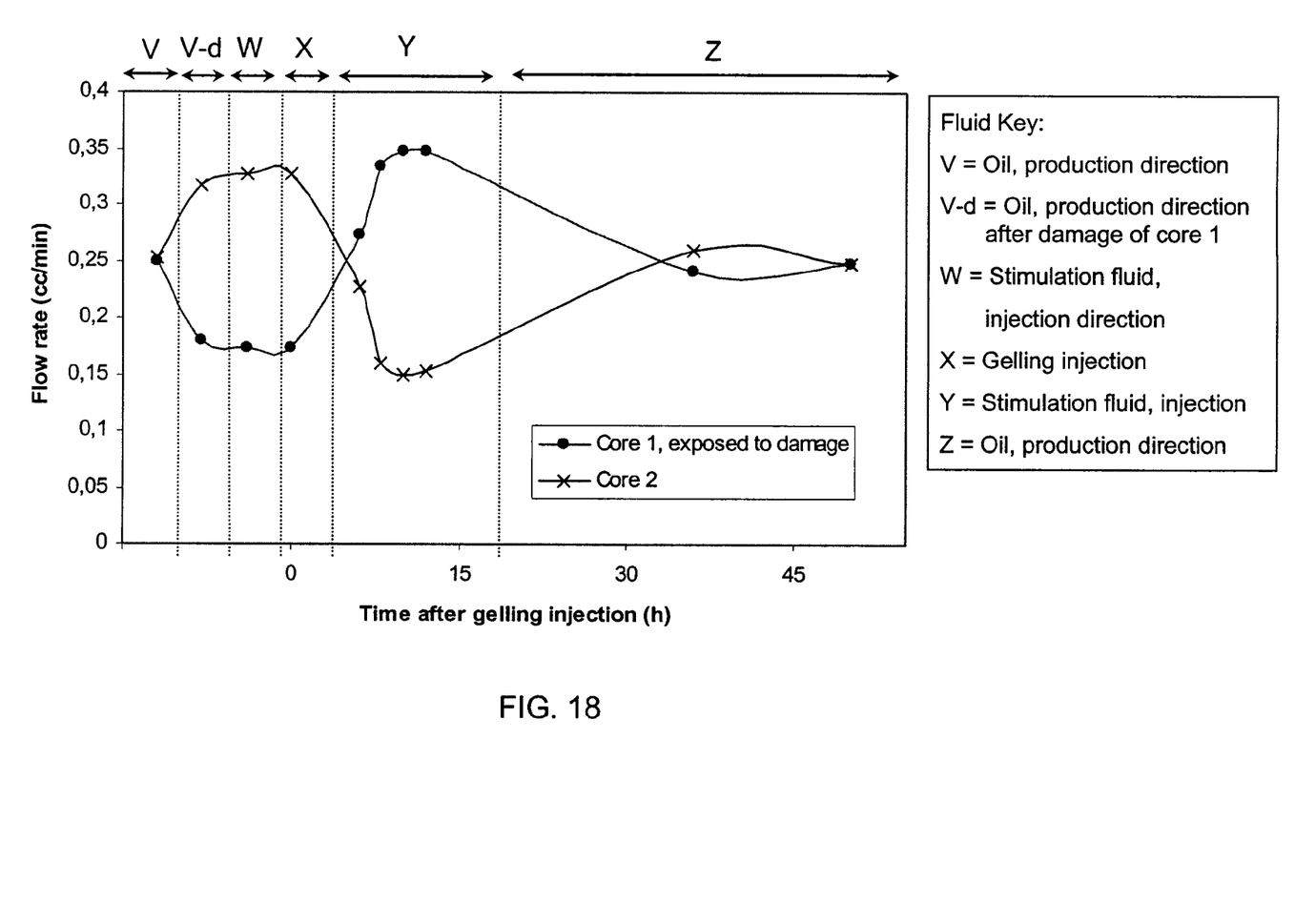
FIGS. 18 and 19 show flow rate and pressure drop for two parallel cores treated in accordance with the present invention.
Figure 19:
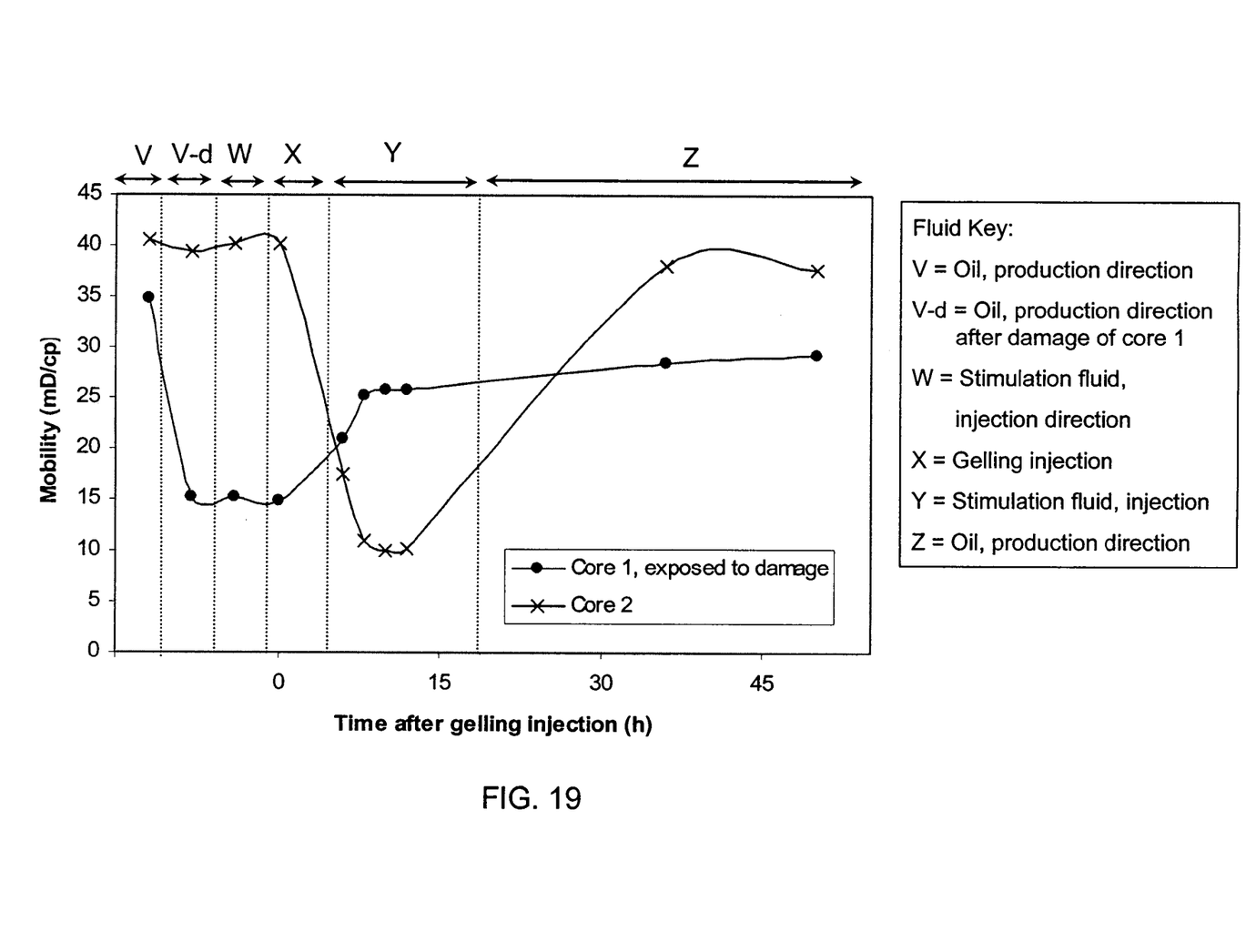

Flow rate over time and mobility over time measurements are shown in FIGS. 18 and 19. As shown, flow through the cores over time switched between the two cores during the period when the gel has set up in the core. This is as desired.

FIG. 19 shows a lower mobility at this same time stage for the undamaged core.

The gel strength for this sample is also illustrated in Table 6 below.

TABLE 6

| Time (h) | 145-O-39 |
|---|---|
| 01:00 | A |
| 03:00 | A |
| 04:00 | B |
| 05:00 | G |
| 06:00 | G |
| 07:00 | G-H |
| 11:00 | H |
| 12:00 | H |
| 24:00 | F |
| 25:00 | F |
| 26:00 | F |
| 27:00 | E |
| 28:00 | E |
| 29:00 | C |
| 30:00 | B |
| 33:00 | A |

It should readily be appreciated that a series of different systems have been prepared in accordance with the present invention and have been shown to function properly as desired.

These systems can advantageously be used to form a reversible gel in a high permeability system and thereby mask this system from flow, for example, to allow delivery of fluid treatments to other lesser permeability formations or zones.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for reversibly positioning a gel in a permeable formation, comprising the steps of:
   providing a reversible gelling system comprising:
   a polymer;
   a crosslinker;
   a gel accelerator; and
   an oxidant, wherein temperature activates the crosslinker so as to cause the system to form a gel, and the oxidant subsequently decomposes the gel;
   pumping the system into a well communicated with the permeable formation whereby the system flows to the permeable formation;
   wherein formation temperature causes the system to form a gel in the permeable formation; and
   allowing the gel to stay in the permeable formation until the gel decomposes, wherein the polymer, crosslinker, gel accelerator, and oxidant are dissolved in an organic solvent and wherein the polymer, crosslinker, gel accelerator and oxidant are present in the system in amounts as follows:
   polymer between about 2 and about 4% wt.;
   crosslinker between about 2.00 and about 4.00% wt.;
   gel accelerator between about 0.10 and about 1.00% wt.; and
   oxidant between about 0.30 and about 1.50% wt.

2. The method of claim 1, wherein, when exposed to temperatures of between about 200° F. and about 350° F., the system forms the gel, and wherein the gel decomposes after a desired period of time.

3. The method of claim 2, wherein the system forms the gel in less than or equal to about four to six hours, and wherein the desired period of time is between about 20 and about 48 hours.

4. The method of claim 1, wherein the polymer is an oil soluble polymer.

5. The method of claim 1, wherein the polymer is a rubber.

6. The method of claim 1, wherein the polymer is a copolymer of styrene-butadiene.

7. The method of claim 1, wherein the crosslinker is dialkyl peroxide.

8. The method of claim 1, wherein the crosslinker is selected from the group consisting of di-tert-butylperoxide, dicumyl peroxide and combinations thereof.

9. The method of claim 1, wherein the gel accelerator is a vulcanization accelerator.

10. The method of claim 1, wherein the gal accelerator is benzothiazil-2-cyclohexyl sulfenamide.

11. The method of claim 1, wherein the oxidant is a hydroperoxide.

12. The method of claim 1, wherein the oxidant is selected from the group consisting of cumyl hydroperoxide, tert-butyl hydroperoxide and combinations thereof.

13. A method for delivering a treatment to a relatively less permeable formation in a well containing a relatively more permeable formation, comprising the steps of:
   providing a reversible gelling system comprising:
   a polymer;
   a crosslinker;
   a gel accelerator; and
   an oxidant;
   wherein temperature activates the crosslinker so as to cause the system to form a gel, and the oxidant subsequently decomposes the gel;
   pumping the system into the well whereby the system flows to the relatively more permeable formation and wherein formation temperature causes the system to gel in the relatively more permeable formation;
   pumping a treatment into the well while the gel is in the relatively more permeable formation whereby the treatment flows substantially to the relatively less permeable formation; and
   allowing the system to decompose and flow out of said relatively more permeable formation, wherein the polymer, crosslinker, gel accelerator, and oxidant are dissolved in an organic solvent and wherein the polymer, crosslinker, gel accelerator and oxidant are present in the system in amounts as follows:
   polymer between about 2 and about 4% wt.;
   crosslinker between about 2.00 and about 4.00% wt.;
   gel accelerator between about 0.10 and about 1.00% wt.; and
   oxidant between about 0.30 and about 1.50% wt.

14. The method of claim 13, wherein the permeability of the relatively more permeable formation, when the gel is present, is less than the permeability of the relatively less permeable formation.

* * * * *